E. T. SHAW.
CONTROL MECHANISM.
APPLICATION FILED DEC. 12, 1914.
1,157,963.
Patented Oct. 26, 1915.
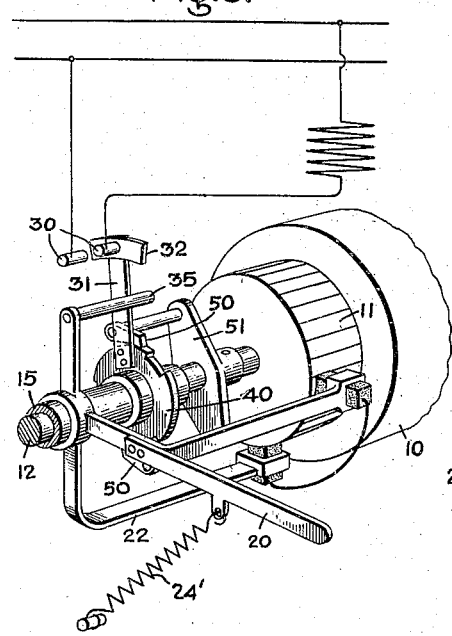
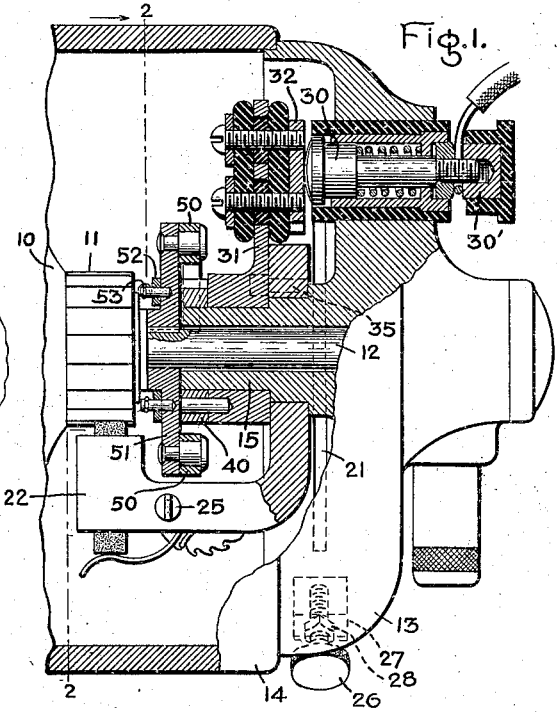
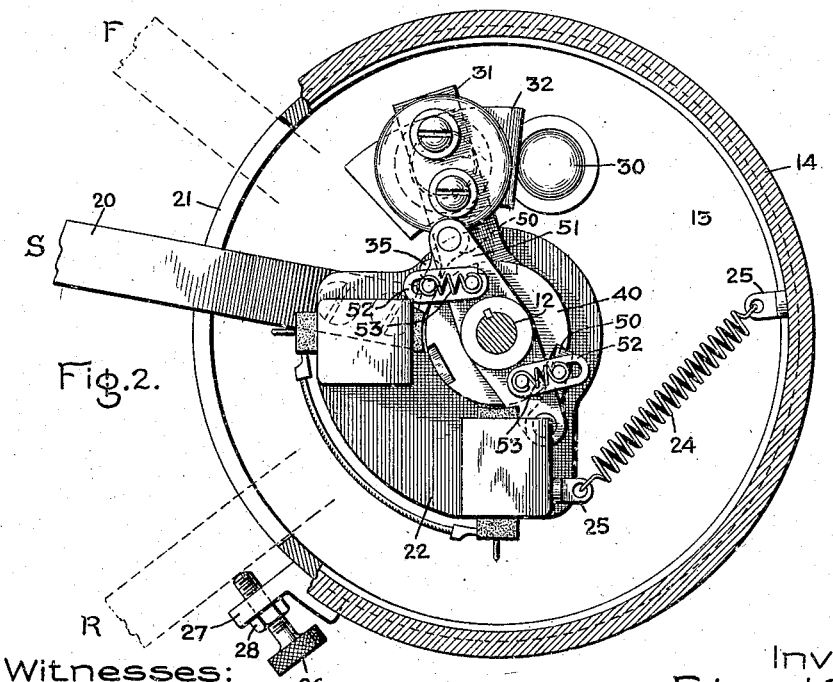
Witnesses:
Marcus L. Byng.
J. Ellis Glen
Inventor:
Edward T. Shaw,
by Albert G. Davis
His Attorney.

UNITED STATES PATENT OFFICE.

EDWARD T. SHAW, OF PITTSFIELD, MASSACHUSETTS, ASSIGNOR TO GENERAL ELECTRIC COMPANY, A CORPORATION OF NEW YORK.

CONTROL MECHANISM.

1,157,963. Specification of Letters Patent. Patented Oct. 26, 1915.

Application filed December 12, 1914. Serial No. 876,826.

*To all whom it may concern:*

Be it known that I, EDWARD T. SHAW, a citizen of the United States, residing at Pittsfield, county of Berkshire, State of Massachusetts, have invented certain new and useful Improvements in Control Mechanisms, of which the following is a specification.

My invention relates to a control mechanism for an electric motor, and more especially to a device for starting, stopping, and controlling the speed of a motor.

Where electric motors are used for driving winding machines, looms, sewing-machines, and other similar devices, it is desirable to be able to readily control the speed of the motor, and is important to be able to quickly stop the motor to prevent overrunning and its obvious disadvantages. When applied to winding machines where yarn is being transferred from one set of spools to another spool, an arrangement is commonly provided so that the driven spool is stopped whenever the yarn breaks. In such an instance, it is important that the stopping take place before the broken end has become embedded in the yarn on the receiving spool, and, therefore, that the motor be positively and quickly stopped. On the other hand, if the stopping is too rapid, the momentum of the delivering spools may be sufficient to throw out an amount of slack sufficient to cause a tangle. It is also required, therefore, that the length of time utilized for stopping be accurately controllable.

One object of my invention is, then, to devise a simple and compact control mechanism for readily starting and stopping an electric motor and controlling its speed.

Another object of my invention is to devise a control mechanism for quickly and positively stopping a motor.

Another object is to arrange such a mechanism so that the motor will be stopped by dynamic braking, and so that the dynamic braking action, and hence the length of time utilized for stopping, may be accurately controlled.

Still another object is to produce a device for stopping a motor by supplying an electr motive force to drive it in the reverse direction and then opening one of the motor circuits.

In the practical embodiment of my invention, I employ some device for controlling the speed of the motor in which a control lever may be moved from a neutral position in either direction and thereby vary the speed, but with opposite directions of rotation. This control lever may be attached to the brush shifting yoke of a repulsion motor, or to a suitably designed rheostat arm in the field circuit of a direct current motor. The lever may be biased into the position for rotation in the reverse direction; *i. e.*, the direction opposite to that normally used, by means of a spring acting on it. A switch, conveniently located on the motor frame, is arranged to open and close the motor circuit. This is preferably designed to coöperate with the control lever, so that it will be closed when the lever is in the position for starting with forward rotation. Means is then provided for opening the switch whenever the motor rotates in the reverse direction for part of a revolution. In the form shown this consists of a ratchet attached to rotate with the moving arm of the switch and of coöperating pivoted spring-pressed pawls carried by the rotor of the motor. As long as the motor rotates in the forward direction the pawls slip over the ratchet or are held away from it by centrifugal force. Just so soon, however, as the motor starts to rotate in the reverse direction, these pawls are spring-pressed against the ratchet and move the switch arm to open the motor circuit. It will be seen, then, that a movement of the control lever to the position for rotation in the reverse direction will quickly and positively stop the motor by dynamically braking the same until it starts to rotate backward and then opening the motor circuit. The degree of braking action and hence the time used in stopping will be controlled by limiting the range of movement and hence the final position of the control lever.

One arrangement of my device is shown in the accompanying drawings, in which—

Figure 1 is a side elevation, partly in section, of a repulsion motor with my device applied thereto; Fig. 2 is a cross-section on the line 2—2 of Fig. 1, looking in the direction of the arrow, and Fig. 3 is a diagrammatic view of my control mechanism applied to a repulsion motor.

For the sake of illustration, I have shown my control mechanism applied to a repulsion motor having a rotor 10 whose commutator is shown at 11, the two being supported on the shaft 12, which has a bearing in the removable end 13 of the motor casing or frame 14. Projecting inwardly from the casing end 13 is a bearing sleeve 15 surrounding the shaft.

The member for controlling the speed and direction of rotation of the motor will preferably be provided with a control lever 20 projecting through a slot 21 in the motor casing. This lever may be used for manual control, or may be suitably attached to other mechanism on the machine to which the motor is applied. For the purpose of controlling the speed of a repulsion motor, a brush-shifting yoke, such as is here shown at 22, carrying brushes which are held against the commutator by suitable springs, is commonly used, and, for the sake of illustration, I have applied the control lever 20 of my mechanism to such a brush-yoke. As is common in this type of motor, the brushes are short-circuited, as will be seen from Fig. 3. I have provided automatic means for urging the control lever and the attached brush-yoke to a position for rotation in the reverse direction, and have here shown it as comprising a spring 24 attached by means of suitable studs 25 to the brush-yoke and the motor casing. The range of movement of the control lever is limited by the slot 21. By properly designing this slot, it would be possible to determine the stopping position of the lever, and hence the degree of braking torque applied when the lever is moved to this position. In order that this stopping position may be accurately regulated, however, I have provided a stop screw 26, passing through a lug 27 on the motor casing and held in position by a lock nut 28. This screw will ordinarily take the place of the end of the slot and determine the braking action.

In one of the motor circuits, and here shown as in the exciting circuit, is located a switch of suitable construction. This switch will preferably comprise insulated spring-pressed contacts 30 in the motor casing 13, which are provided with wire-attaching means 30'. The movable element of my switch consists of a switch arm 31 rotatably mounted on the bearing sleeve 15 and provided at its extremity with a contact plate 32 for bridging the spring-pressed contacts 30. This contact plate 32 is insulated from the switch arm 31, as is clearly shown in Fig. 1. For a purpose to be later explained, a stud 35 is provided on the brush-yoke in a position for engagement with the movable arm 31 when the arm and yoke are in the relative positions shown in Fig. 2. A ratchet 40, also rotatably mounted on the bearing sleeve 15, is pinned to the movable arm 31 of the switch. Coöperating with the ratchet 40 are pawls 50 which are carried by the rotor of the motor in any desired manner, and are here shown as pivotally mounted on a supporting member 51 which is keyed to the motor shaft 12. Suitable guides 52 and springs 53 serve to press the pawls toward the ratchet.

I have here illustrated and described my device as it would be applied to a repulsion motor where the brush axis is so located with reference to the exciting winding that only a slight range of movement to either side of a neutral axis is necessary in order to bring the motor to maximum speed, while further movement away from the axis will decrease the speed. With such an arrangement the direction of rotation of the motor coincides with the direction of movement of the control lever as it is moved away from the neutral axis. As will be well understood, however, there is another neutral axis which is ninety electrical degrees removed from the first axis. Now, movement of the control lever away from this axis will start the motor at low speed, and further movement away from the axis will increase the speed. The direction of rotation, however, will be opposite to the direction of movement of the control lever as it leaves the neutral axis. As will be seen from the description of the operation of the device, it is desirable, although not necessary, that the closing movement of the switch shall coincide with the forward direction of rotation in order that the opening of the switch may be effected by directly connecting the motor shaft and switch arm by means of pawl and ratchet upon rotation in the reverse direction. It is further desirable that movement of the control lever to the position for forward rotation shall close the switch. Suitable means of connecting the two is, therefore, provided, and in the case here illustrated, where the movement of the lever coincides with the forward direction of rotation and hence with the closing movement of the switch, this means takes the simple form of a pin 35.

The operation of my control mechanism will be most readily understood by reference to the diagrammatic illustration in Fig. 3, where the control lever has been shown in its released position. For clearness of illustration, this view shows a spring 24' acting upon the control lever which is directly attached to the lever, but in a position to effect the same movement as the spring 24 in Fig. 2. If it is desired to start the motor, the control lever will be moved against the action of the spring from the stopping position (R) (see Fig. 2)—which is the position for rotation in the reverse direction at some determined speed—to the starting position (S)—which is the position for maximum speed in the forward direction.

When the control lever reaches this position, the stud 35 on the brush-yoke will engage the movable arm of the switch and cause the contact plate 32 to bridge the spring-pressed contacts 30, thereby closing the motor circuit. Further movement of the control lever toward the position (F) will gradually decrease the speed of the motor in a well understood manner, but without opening the motor circuit. The speed may be then decreased and increased at will within its range of control for the forward direction of rotation by movement of the lever between the positions (S) and (F). If, however, the control lever should be released, the automatic means consisting of the spring 24 will move the lever to cause the motor to run in the reverse direction, the range of movement of the control lever being limited by the slot 21 in the motor casing.

Obviously, the spring 24 may be omitted and the same result effected by manual movement of the lever to the position (R). By bringing the lever to the position (R), I have shifted the brushes across the neutral axis to a position where the machine starts to act as a dynamo and generates a counter-electromotive force, thereby dynamically braking the machine and bringing it to a standstill. The exciting current is still applied, however, and so the motor actually reverses its direction of rotation, turning a fraction of a revolution sufficient to open the switch, and then stops. During the rotation of the motor in the forward direction the pawls are normally inoperative as they have been slipping over the teeth on the ratchet 40, or have been thrown outwardly by centrifugal force against the tension of the springs 53 and held away from the ratchet. If, however, the motor starts to rotate in the reverse direction, these pawls will be drawn inwardly and engage the teeth of the ratchet 40, turning the same and its attached switch arm so that the switch in the motor circuit is opened and the power supply cut off. The rotation of the switch arm will be limited by contact with the stud 35 on the brush-yoke, so that in no case can there be a rotation in the reverse direction for more than a fraction of a revolution.

By determining the position of the lever for stopping, I am able to accurately determine the braking torque applied, because I have brought the control lever to a position tending to cause rotation in the reverse direction at a certain definite speed. This, in connection with the momentum of the moving parts, will determine the length of time used in stopping, and hence the number of revolutions of the motor made after the lever is moved to the stopping position. The length of the range of movement of the brushes, the speed with which they are moved to the stopping position, and the fact of operation through the high speed axis or the low speed axis are all determining factors, but it has been found by test that they are negligible in comparison with variation of the stopping position of the control lever. I have, therefore, provided an adjustable stop whereby this position may be accurately determined and regulated. This makes it possible to use my motor in any one of a number of applications where the conditions require a variation in the time used in stopping.

It will thus be seen that I have provided a simple and compact control mechanism for readily starting and controlling the speed of an electric motor and for stopping the motor quickly and positively by causing it to start to rotate in the reverse direction. I conceive, however, that various modifications and rearrangements of my particular mechanism may be made within the scope of my invention, and I, accordingly, do not desire to be limited to the exact details shown, but seek to cover in the accompanying claims all devices within the true scope and spirit of my invention.

What I claim as new and desire to secure by Letters Patent of the United States, is:—

1. A controlling and stopping device comprising a movable member for controlling the speed of the motor in a forward direction and reversing its direction of rotation, and means whereby the motor circuit is automatically opened when the motor starts to rotate in the reverse direction upon the movement of the member to reverse position.

2. A controlling and stopping device comprising a movable member for controlling the speed of the motor in a forward direction and reversing its direction of rotation, biased to the reverse position, and means whereby the motor circuit is automatically opened when the motor starts to rotate in the reverse direction upon the movement of the member to reverse position in response to its bias.

3. A control mechanism for an electric motor comprising movable means for controlling the speed and direction of rotation of the motor, automatic means biasing said movable means toward the position for rotation in one direction, a switch in the motor circuit, and normally inoperative means for opening said switch to stop the motor after said automatic means has become effective.

4. A control mechanism for an electric motor comprising movable means for controlling the speed and direction of rotation of the motor, automatic means biasing said movable means toward the position for rotation in one direction, a switch in the motor circuit, connections between said movable means and said switch for closing the same, and normally inoperative means for opening said switch to stop the motor after said automatic means has become effective.

5. A control mechanism for an electric motor comprising a switch in the motor circuit, a speed control member, connections between said member and switch whereby the switch may be closed to start the motor in one direction, and means operated by the motor to open the switch upon a reversal in the direction of rotation of said motor.

6. A control mechanism for an electric motor comprising movable means for controlling the speed and direction of rotation of the motor, automatic means biasing said movable means toward the position for rotation in one direction, a switch in the motor circuit, and normally inoperative means for opening said switch upon rotation of the motor in this direction.

7. A control mechanism for an electric motor comprising movable means for controlling the speed and direction of rotation of the motor, automatic means biasing said movable means toward the position for rotation in one direction, adjustable means for regulating the latter position, a switch in the motor circuit, and normally inoperative means for opening said switch upon rotation of the motor in this direction.

8. In combination, a dynamo electric commutator machine, brushes for said machine, a brush-shifting yoke carrying said brushes and capable of a range of movement to control the speed in opposite directions, a spring urging said yoke in one direction, a switch in a circuit of said machine comprising a switch arm mounted to rotate around the shaft of said machine, means operatively related to said yoke for engaging said arm to close said switch at a predetermined position of the yoke, and means carried by the machine to open said switch upon rotation of the machine in a predetermined direction.

9. In combination, a dynamo-electric commutator machine, brushes for said machine, a brush-shifting yoke carrying said brushes and capable of a range of movement to control the speed in opposite directions, a spring urging said yoke in one direction, adjustable means for limiting the movement of said yoke in the latter direction, a switch in a circuit of said machine comprising a switch arm mounted to rotate around the shaft of said machine, means operatively related to said yoke for engaging said arm to close said switch at a predetermined position of the yoke, and means carried by the machine to open said switch upon rotation of the machine in a predetermined direction.

10. In combination, a dynamo electric commutator machine, said machine including a shaft and a frame, the latter provided with a bearing sleeve surrounding said shaft, a brush yoke rotatably mounted on said sleeve, a spring urging said yoke in one direction, a switch arm rotatably mounted on said sleeve, a coöperating contact carried by said frame, a stud on said yoke in operative relation to said arm, a ratchet carried by said switch arm and surrounding said sleeve, spring-pressed pawls carried by said shaft and adapted to engage said ratchet, for the purpose described.

11. In combination, a dynamo electric commutator machine, said machine including a shaft and a frame, the latter provided with a bearing sleeve surrounding said shaft, a brush yoke rotatably mounted on said sleeve, a spring urging said yoke in one direction, adjustable means for limiting the movement of said yoke in the latter direction, a switch arm rotatably mounted on said sleeve, a coöperating contact carried by said frame, a stud on said yoke in operative relation to said arm, a ratchet carried by said switch arm and surrounding said sleeve, spring-pressed pawls carried by said shaft and adapted to engage said ratchet, for the purpose described.

12. A control mechanism for an electric motor comprising a control member adapted and arranged to vary the speed of said motor with opposite directions of rotation when moved to opposite sides of a neutral axis, a switch controlling the motor circuit, and means connecting said switch with said member so that the switch will be closed when the member is moved into the position for starting the motor in one direction and will remain closed upon further movement of said member in either direction on the same side of the neutral axis.

13. In combination, a repulsion motor, a brush-shifting yoke therefor movable across a neutral axis, a switch controlling one of the motor circuits, and means connecting said switch with said yoke so that the switch will be closed when the yoke is moved into the position for starting the motor in one direction and will remain closed upon further movement of said yoke in either direction on the same side of the neutral axis.

14. A control mechanism for an electric motor comprising a rotatable member, a switch operatively connected thereto, a pawl carried by said motor arranged in operative relation to said member and adapted to move said member when the motor rotates in one direction, and to be held out of engagement therewith by centrifugal force when the motor rotates in the other direction.

15. In combination, an electric motor comprising a rotor, a switch in the circuit of said motor comprising a fixed contact and a movable contact, a ratchet attached to said movable contact, and pawls carried by said rotor adapted to engage said ratchet to open said switch in one direction of rotation of the motor.

16. In combination, an electric motor comprising a casing and a rotor journaled in said casing, a switch in the circuit of said motor comprising a fixed contact supported on said casing and a movable contact associated with the fixed contact, said movable contact being rotatably mounted concentrically with said rotor, a ratchet attached to said movable contact, and pawls carried by said rotor adapted to engage said ratchet to open said switch in one direction of rotation of the motor.

In witness whereof, I have hereunto set my hand this 8th day of Dec., 1914.

EDWARD T. SHAW.

Witnesses:
A. R. NUGENT,
O. L. READ.

Copies of this patent may be obtained for five cents each, by addressing the "Commissioner of Patents, Washington, D. C."